Figure 1:
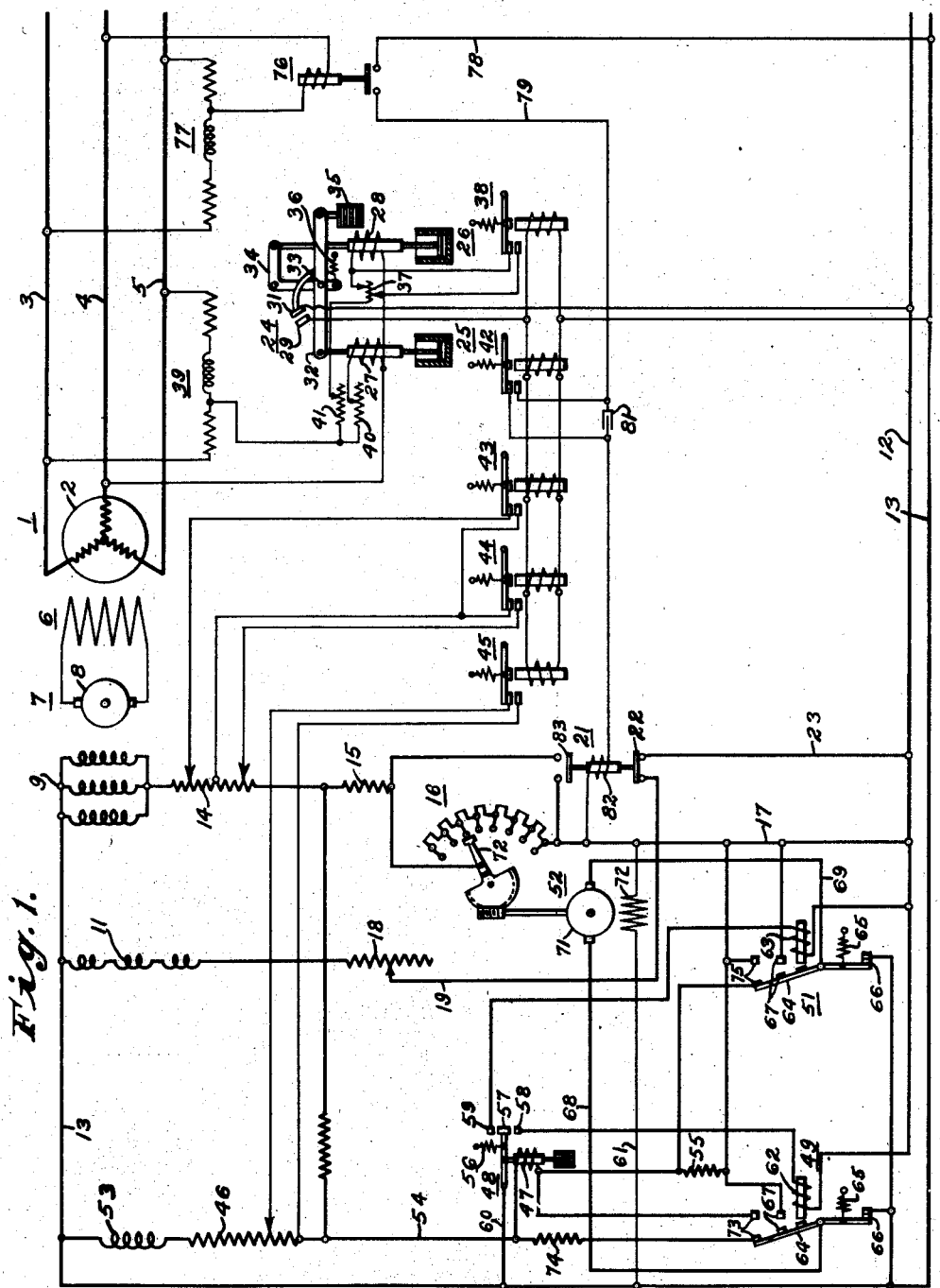

INVENTORS
John H. Ashbaugh, and
Homer C. Nycum
BY
ATTORNEY

Patented July 5, 1932

1,865,949

UNITED STATES PATENT OFFICE

HOMER C. NYCUM, OF WILKINSBURG, AND JOHN H. ASHBAUGH, OF PITTSBURGH, PENN-SYLVANIA, ASSIGNORS TO WESTINGHOUSE ELECTRIC AND MANUFACTURING COMPANY, A CORPORATION OF PENNSYLVANIA

REGULATOR SYSTEM

Application filed December 7, 1929. Serial No. 412,548.

Our invention relates to regulator systems for governing the excitation of dynamo-electric machines.

In many regulator systems, such as those used to regulate the excitation of the field winding of an alternating-current generator, it is desirable to provide for a large range of regulation and it is also desirable that the regulator system be capable of varying the excitation of the generator rapidly, between extreme values, upon the occurrence of certain power-circuit conditions, such as line faults.

In a regulator of the vibrating type wherein relays are employed to intermittently short circuit resistors connected in series-circuit relation with the field windings of the regulated machine, the number of such resistors and cooperating relays required to vary the excitation of a large machine from no load excitation to the ceiling voltage becomes very large, as it is impractical to short-circuit more than a certain limited amount of resistance by each relay employed. A regulator of the rheostatic type is smooth in its operation from minimum to maximum excitation values and may readily be adapted for a wide range of regulation. It is, however, inherently slower in its operation than the vibrating type and is ordinarily unsuited for installations where high-speed excitation is required.

We have provided a regulator system wherein a rheostatic-type regulator is used for controlling a portion of the field resistor and a vibrating-type regulator is provided for controlling another portion of the field resistor. The rheostatic regulator is so governed that, for ordinary variations in load upon the machine, the excitation is effected by means of the vibrating regulator. This arrangement makes for smooth operation of the regulator system, as a whole, while also making it unnecessary for the vibrating regulator to control a large range of resistance values.

An object of our invention is the provision of a regulator system that shall be capable of varying the excitation of a dynamo-electric machine throughout a wide range of operation.

Another object of our invention is the provision of a regulator system of the above-described character that shall be capable of varying the excitation of a dynamo-electric machine smoothly over a wide range and that shall be capable of varying the excitation abruptly upon the occurrence of predetermined power-circuit conditions.

A further object of our invention is the provision of a regulator system that shall make use of the principle of the vibrating regulator for a certain range of excitation or resistance values and that of the rheostatic regulator for a further range of resistance values.

A still further object of our invention is to provide for proportioning the relative values of resistance between the rheostat and the relay-controlled resistance to give maximum transmitted load in the region of artificial stability.

Figure 2:
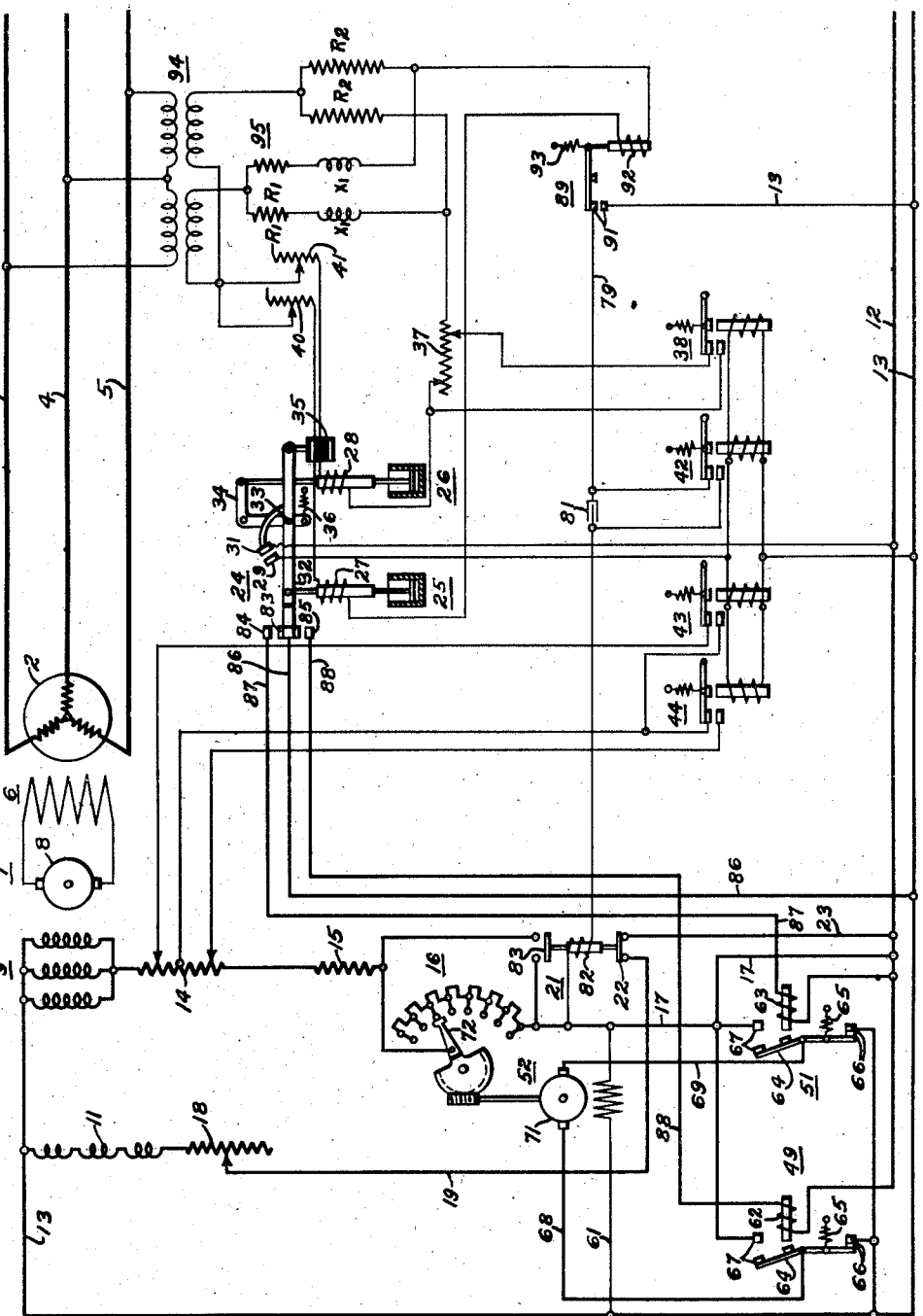
Figure 3:
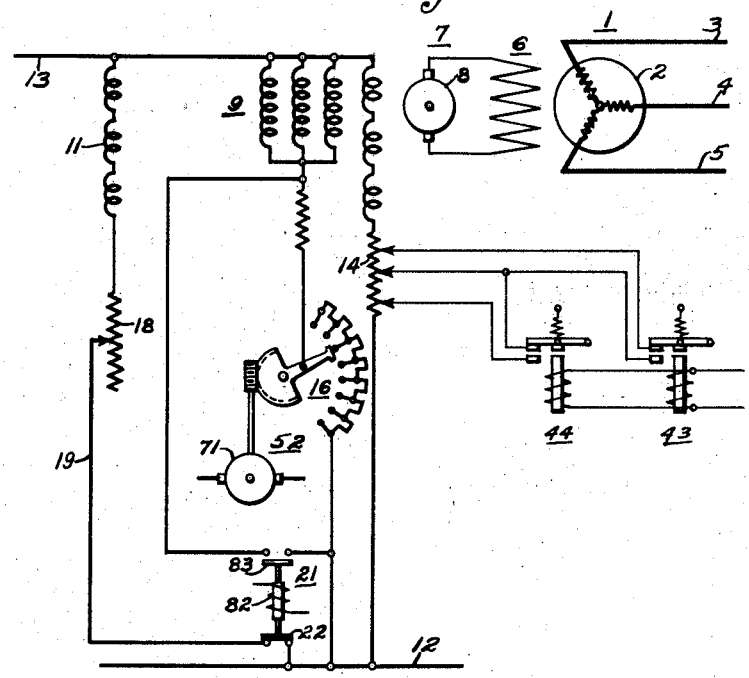
Figure 4:
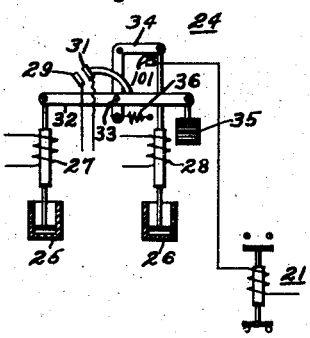

Our invention will be better understood by reference to the accompanying drawings in which Figure 1 is a diagrammatic view of circuits and apparatus comprising a preferred embodiment of our invention, Fig. 2 is a diagrammatic view of circuits and apparatus comprising a second preferred embodiment of our invention, Fig. 3 is a diagrammatic view of a modified system of field circuits of the regulated machine, and Fig. 4 is a view, partially in side elevation and partially in section of a modification of the high-speed excitation-control contact members.

Referring to Fig. 1 of the drawings, an alternating-current generator 1 is shown having an armature winding 2 for supplying power to three-phase supply conductors 3, 4 and 5, and with a field winding 6 that is supplied with electrical energy from the exciter generator 7. The exciter generator 7 is provided with an armature winding 8 and with field windings 9 for controlling the excitation thereof, and which may be connected in parallel-circuit relation to each other, as illustrated.

A "bucking" field winding 11 that is differentially related to the windings 9 may be provided, and the several windings 9 and 11 may be energized from any suitable source of current supply, such as the direct-current conductors 12 and 13. The circuit of the field windings 9 may be traced from the supply conductor 13, through the windings 9, the regulating resistor 14 that is controlled by a vibrating type regulator, resistor 15, rheostat 16, and conductor 17, to the supply conductor 12. The field winding 11 is energized by a circuit from the supply conductor 13, through the windings 11, a variable resistor 18, conductor 19, the contact member 22 of a contactor 21, and conductor 23, to the supply conductor 12. In certain cases, the connection through the contact member 22 may be omitted, thus continuously energizing the field winding 11.

A vibrating-type regulator 24 is provided comprising a pair of electromagnets 25 and 26 having operating windings 27 and 28, respectively, for controlling the engagement of contact members 29 and 31. The contact member 29 is mounted in a fixed position and is engaged by and disengaged from the movable contact member 31 that is carried by a lever 32. The lever 32 is pivotally connected, at its left-hand end, to the electromagnet 25 and is carried by the bell-crank lever 34 upon which it is pivotally mounted at 33. The lever 34 is connected, at its right-hand end to be actuated by the electromagnet 26. The weight of the electromagnet core 25 is partially balanced by the weight 35 attached to the right-hand end of the lever 32, and the weight of the electromagnet 26 is partially balanced by the biasing member 36 attached to the bell-crank lever 34.

The windings 27 and 28, when energized, actuate the electromagnets 25 and 26 upwardly against the pull of their associated dashpots, thus causing engagement of the contact members 29 and 31. A resistor 37 is provided in circuit with the winding 28 and is short circuited by the relay 38 upon the engagement of the regulator contact members thus giving a vibrating action to the magnet 26. The regulator windings 27 and 28 are enerized in accordance with the positive phase-sequence voltage component of the power-circuit conductors 3, 4 and 5, through the phase-sequence net-work 39, which is more particularly described in the patent to C. T. Allcott, No. 1,571,224, issued February 2, 1926 and assigned to the Westinghouse Electric & Manufacturing Company. An adjustable resistor 40 is provided in series with the winding 27 for adjusting the voltage that it is desired the regulator should maintain upon the power circuit. A similar resistor 41 may be provded in series with the winding 28 of the anti-hunting magnet.

The regulator 24 controls the group of relays 38, 42, 43, 44 and 45, causing each of them to close a circuit through their associated contact members upon engagement of the regulator contact members 29 and 31.

The relay 38, which short circuits the resistor 37, upon engagement of the regulator contact members, causes an increase in the excitation of the winding 28. The electromagnet 26 is thus actuated upwardly to cause the pivot point 33 to be moved toward the right to disengage the contact members 29 and 31. The contact members 29 and 31 will thus be brought into and out of engagement with each other for greater or lesser periods of time, depending upon the variations of the voltage of the power circuit. The relays 43 and 44 control the effective value of the resistor 14 by intermittently short circuiting this resistor in accordance with the operation of the regulator 24, thus controlling the excitation of the field windings 9 within a given range of operation, depending upon the resistance of the resistor 14.

The operation of the rheostat 16 is controlled by a relay 48 that is energized by a circuit from the supply conductor 13, through the choke coil 53, the resistor 46, conductor 54, relay winding 47, resistor 55, and conductor 17, to the supply conductor 12. The pilot relay 45 controls the operation of the relay 48 by intermittently short circuiting a portion of the resistor 46, thus varying the voltage applied to the winding 47 of the relay 48. This relay controls the operation of the reversing switches 49 and 51 to cause the operation of the rheostat motor 52 in the one or the other direction.

The pilot relay 45 is actuated similarly to the shunting relays 44 and 43 and is effective to vary the average pull upon the magnet of the relay 48. The current pulsations through the circuit of this relay are smoothed out by the choke coil 53. If, however, the percent of time that the relay 45 is open varies, the average pull on the magnet of the relay 48 varies correspondingly in the one or in the other direction. This variation in the pull of the magnet, after existing for a sufficient interval of time to overcome the damping action of the dashpot, causes the moving contact 57 to engage the one or the other of the fixed contacts 58 and 59, thus energizing one of the operating windings 62 and 63 of the reversing switches 49 and 51.

An increase in the energization of the winding 47 causes the relay armature to be pulled down against the biasing spring 56, thus causing the engagement of the contact members 57 and 58 and energizing the winding 62 of the switch 49. Similarly, a decrease in the energization of the relay winding 47 causes the relay armature to be moved upwardly by the biasing spring 56, thus effecting engagement of the contact members 57 and 59 and the energization of the winding 63 of the switch 51. A circuit is thus completed from the supply conductor 13, through the conductor 60, the contact member 57 of the relay 48, one of the relay contact members 58 and 59 and one of the switch operating windings 62 and 63, to the supply conductor 12.

Each of the reversing switches 49 and 51 comprises a contact-carrying arm 64 that is normally biased to the illustrated position by a spring or other biasing means 65, thus causing engagement of the contact members 66 which connect the contact arms to the supply conductor 13. Contact members 67 are provided on each contact arm 64 and are brought into engagement upon the operation of the switches, thus connecting the contact arms 64, by means of the conductor 17, to the supply conductor 12.

Upon the actuation of one of the switches, 49 or 51, in a direction to close a circuit through the contact members 67 thereof, a circuit is completed from one of the supply conductors 12 or 13, through conductor 68, armature winding 71 of the motor 52 and conductor 69 to the other conductor of supply conductors 12 and 13, thus causing the operation of the rheostat motor 52 in the one or in the other direction. The operation of the other reversing switch to its second operative position causes a circuit to be closed through the conductors 68 and 69 in the reverse direction through the armature winding 71, thus operating the rheostat motor 52 in the opposite direction. The rheostat motor 52 is provided with a field winding 72 that is connected in a circuit from the supply conductor 13, through conductor 61, field windings 72 and conductor 17, to the supply conductor 12.

Upon energization of the relay winding 47 sufficiently to cause engagement of the contact members 57 and 58, and the operation of the switch 49 to a position to close a circuit through the contact members 67, a circuit is also closed through the resistor 74 and contact members 73 in shunt relation to the winding 47, thus decreasing the energization of the winding 47 and causing an anti-hunting action. Upon engagement of the relay contact members 57 and 59 and the operation of the switch 51 to a position to close a circuit through the contact members 67, a circuit is also closed through the contact members 75 in shunt relation to the resistor 55, thus increasing the energization of the winding 47 and effecting an anti-hunting action of the relay 48.

A relay 76 is provided for initiating a rapid increase in the excitation of the generator upon the occurrence of a fault in the transmission line. The relay 76 is energized from a positive-sequence network 77 in accordance with the voltage of the power circuit and is effective to close a circuit through its contact members upon a rapid decrease in line voltage. This circuit may be traced from the supply conductor 13, through conductor 78, relay 76, conductor 79, condenser 81, winding 82 of the relay 21 and conductor 17, to the supply conductor 12. A relay 42, which is one of the relays controlled by the regulator 24, closes a circuit in shunt relation to the condenser 81 upon engagement of the regulator contact members 29 and 31. Upon the simultaneous closing of the contact members of the relays 76 and 42, the contactor 21 is actuated to its upper position, closing a circuit through the contact member 83 in shunt relation to the rheostat 16, thus causing a rapid increase in the excitation of the field windings 9, and, at the same time, opening a circuit through the contact member 22 and the bucking field winding 11, thus effecting a rapid deenergization of this field winding.

In the operation of the system disclosed in Fig. 1, the vibrating regulator 24 controls the excitation of the field windings 9 within the limits of the effective value of the resistor 14. As the percentage of time during which the regulator contact members are in engagement varies, the average pull upon the relay winding 47 correspondingly varies, thus actuating the relay 48 to control the operation of the rheostat 16 in a manner to increase or decrease the resistance in series with the field winding 9 as the limit of the effective value of the resistor 14 is approached. The operation of the rheostat 16 is thus such that the effective value of resistor 14 is restored to a desired value between its effective maximum and minimum values.

When quick response is required to increase the excitation of the generator very rapidly, the relays 76 and 42 jointly effect the operation of the contactor 21 in a direction to rapidly increase the energization of the windings 9 and decrease the energization of the differential windings 11. The contactor 21 remains under control of the regulator 24 through the operation of the relay 42 so long as the relay 76 remains closed, that is, so long as the high value of excitation is required. The regulator 24 may, therefore, interrupt the operating circuit of the contactor 21 independently of the relay 76. In some cases, it may be found unnecessary to use the relay 42 and the condenser 81 in which case the contactor is controlled by the relay 76 alone.

The embodiment of our invention illustrated in Fig. 2 operates, in general, similarly to that illustrated in Fig. 1. In the system of Fig. 2, the relay 48, for controlling the rheostat 16, is omitted and the rheostat motor 52 is controlled by contact members directly actuated by the regulator 24. A movable contact member 83 is carried by and insulated from, the regulator lever 32 for engaging fixed contact members 84 and 85. The contact member 83 is connected to the supply circuit conductor 13 by means of a conductor 86, and the contact members 84 and 85 and connected, respectively, by means of conductors, 87 and 88, through the windings 63 and 62 of the reversing switches 51 and 49 respectively, to the supply conductor 12. The levers 34 and 32 assume substantially definite positions for a definite percentage of time of contact engagement and these positions are such that, within a certain range in the effective value of the resistor 14, the contact member 83 will not engage either of the contact members 84 and 85. Should, however, the voltage vary sufficiently from its desired value, the energization of the winding 27 would increase or decrease sufficiently to cause engagement of the contact member 83 with one of the contact members 84 and 85, thus actuating the corresponding reversing switch, 49 and 51 to operate the rheostat 16 in the proper direction.

In this form of the invention, a relay 89 is provided for performing a similar operation to that performed by relay 76 of Fig. 1. The relay 89 comprises contact members 91 for completing a circuit through the operating winding 82 of the relay 21, and is actuated by an electromagnet energized by the winding 92 in opposition to a biasing member 93. The winding 92 is connected in series relation with the winding 27 through the positive sequence network 95.

Fig. 3 shows an arrangement having a plurality of field-winding circuits. The resistor 14, that is intermittently varied by the regulator 24, is connected in series-circuit relation with certain field windings and the rheostat 16 is connected in series-circuit relation with other field windings of the exciter generator.

Fig. 4 shows a means for controlling the high-speed excitation of the system wherein contact members 101 are provided on the bell-crank 34 of the regulator for performing a function similar to the relay 76 of Fig. 1, or the relay 89 of Fig. 2. These contacts are so positioned that, during the normal operation of the regulator, they will not come into engagement. Should, however, the voltage of the transmission line drop sufficiently below its desired value, the electromagnet 27 would be moved downwardly a sufficient amount to cause engagement of the contact members 101, thus completing a circuit through the winding of contactor 21 and operating it to its upper position, short circuiting the rheostat 16 and opening the circuit through the differentially-related windings 11.

Since many modifications and variations may be made in the details of apparatus and circuits from what we have described without departing from the spirit of our invention, we do not wish to be limited otherwise than by the scope of the appended claims.

We claim as our invention:

1. In a regulator system, a power circuit, a dynamo-electric machine connected to said power circuit, means for governing the excitation of said dynamo-electric machine comprising a field-winding circuit, a resistor and a rheostat included in said circuit, a vibrating regulator for varying the effective value of said resistor in accordance with an electrical quantity of said power circuit, and means, controlled by said regulator, for operating said rheostat upon a predetermined variation in the effective value of said resistor from its mid value, and means, operating under predetermined power-circuit conditions, for short circuiting said rheostat.

2. In a regulator system, a power circuit, a dynamo-electric machine connected to said power circuit, means for governing the excitation of said dynamo-electric machine comprising a field-winding circuit, a resistor and a rheostat included in said circuit, a vibrating regulator for varying the effective value of said resistor in accordance with an electrical quantity of said power circuit, a plurality of relays controlled by said regulator for varying the effective value of said resistor, means, controlled by said regulator, for governing the operation of said rheostat, and means, operating under predetermined power-circuit conditions, for short circuiting said rheostat.

3. In a regulator system, a power circuit, a dynamo-electric machine connected to said power circuit, means for governing the excitation of said dynamo-electric machine comprising a resistor and a rheostat, a regulator comprising contact-making means for intermittently varying the effective value of said resistor, a pilot motor for operating said rheostat, contact-making means controlled by said regulator for controlling the operation of said rheostat motor in the one or the other direction, and means, operating under predetermined power-circuit conditions, for short circuiting said rheostat.

4. In a regulator system, a power circuit, a dynamo-electric machine connected to said power circuit, means for governing the excitation of said dynamo-electric machine comprising a resistor and a rheostat, a regulator comprising contact-making means for intermittently varying the effective value of said resistor, a pilot motor for operating said rheostat, contact-making means controlled by said regulator for controlling the operation of said rheostat motor in the one or the other direction, means for abruptly varying the effective value of said rheostat, and means, operative under predetermined power-circuit conditions, for placing said last named means under the control of said regulator.

5. In a regulator system, a power circuit, a dynamo-electric machine connected to said power circuit, means for governing the excitation of said dynamo-electric machine comprising a field-winding circuit, a resistor and a rheostat included in said circuit, a vibrating regulator for varying the effective value of said resistor in accordance with an electrical quantity of said power circuit, a plurality of relays controlled by said regulator for varying the effective value of said resistor, means, controlled by said regulator, for governing the operation of said rheostat, and means, operative upon a predetermined variation of the regulated quantity from its desired value, for short circuiting said rheostat.

6. In a regulator system, a power circuit, a dynamo-electric machine connected to said power circuit, means for governing the excitation of said dynamo-electric machine comprising a resistor and a rheostat, a regulator comprising contact-making means for intermittently varying the effective value of said resistor, a pilot motor for operating said rheostat, contact-making means, controlled by said regulator, for controlling the operation of said rheostat motor in the one or the other direction, and means, operative upon a predetermined variation of the regulated quantity from its desired value, for short circuiting said rheostat.

7. In a regulator system, a power circuit, a dynamo-electric machine connected to said power circuit, means for governing the excitation of said dynamo-electric machine comprising a plurality of field-winding circuits, a resistor and a rheostat included in at least one of said circuits, a regulator, actuated in accordance with a predetermined quantity of said power circuit, for controlling the effective value of said resistor and rheostat, and means, operative upon a predetermined variation of the regulated quantity from its desired value, for abruptly varying the conditions of said field-winding circuits.

8. In a regulator system, a power circuit, a dynamo-electric machine connected to said power circuit, means for governing the excitation of said dynamo-electric machine comprising a field-winding circuit, a resistor and a rheostat included in said circuit, a vibrating regulator comprising a pair of contact members for varying the effective value of said resistor in accordance with an electrical quantity of said power circuit, a plurality of relays controlled by said regulator for varying the effective value of said resistor, means, controlled in accordance with variations in the percentage of time of engagement of said contact members, for governing the operation of said rheostat, and means, operative upon a predetermined variation of the regulated quantity from its desired value, for abruptly varying the conditions of said field-winding circuits.

In testimony whereof, we have hereunto subscribed our names this 5th day of December, 1929.

HOMER C. NYCUM.
JOHN H. ASHBAUGH.